Feb. 20, 1945.  K. L. WOODMAN  2,370,102
PITOT-STATIC AIR SPEED INDICATOR
Filed Jan. 7, 1944
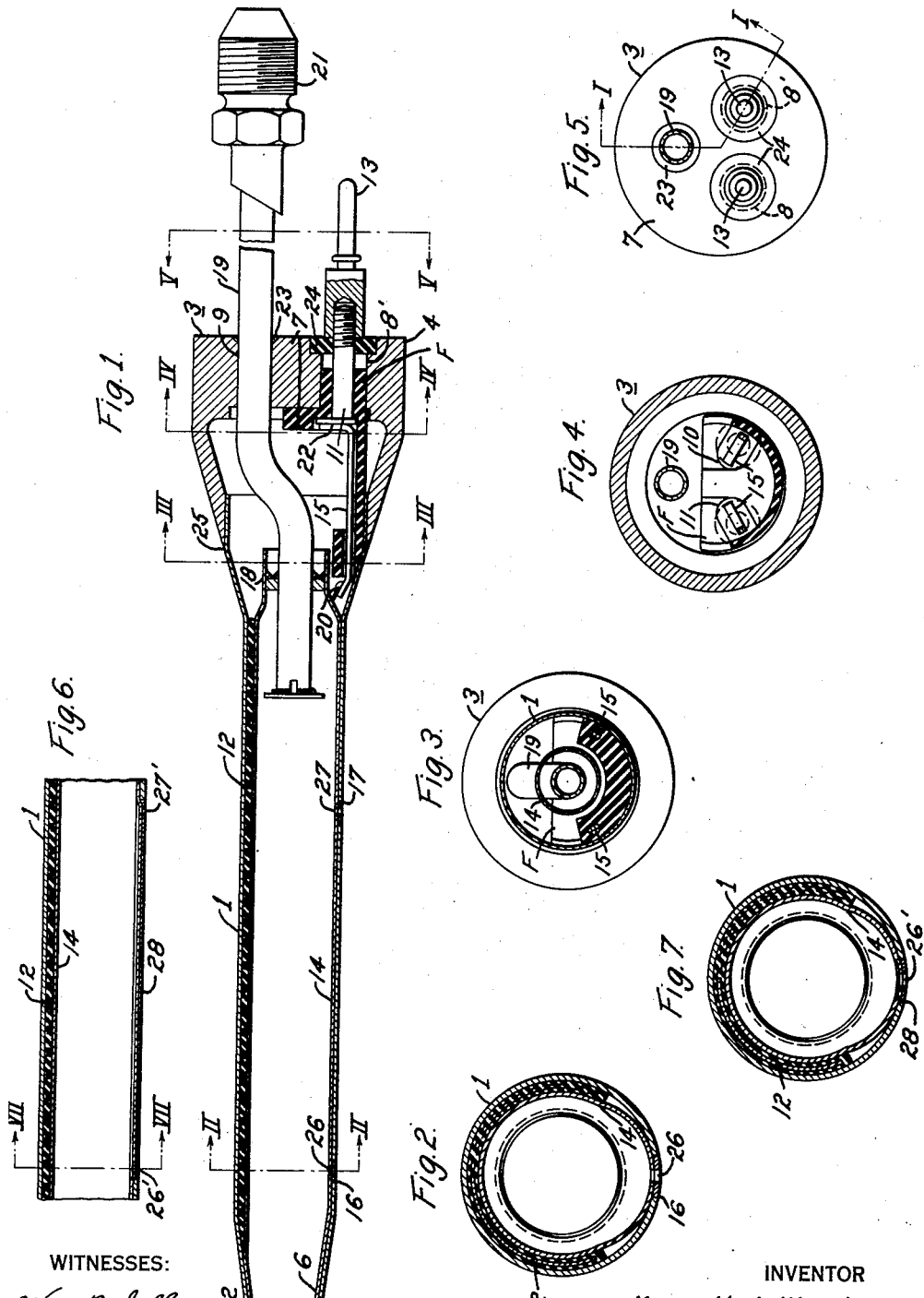
WITNESSES:
Wm. B. Sellers
INVENTOR
Kenneth L. Woodman
BY
Paul E. Friedemann
ATTORNEY Patented Feb. 20, 1945

2,370,102

UNITED STATES PATENT OFFICE 2,370,102

PITOT-STATIC AIR-SPEED INDICATOR

Kenneth L. Woodman, Mansfield, Ohio, assignor to Westinghouse Electric & Manufacturing Company, East Pittsburgh, Pa., a corporation of Pennsylvania Application January 7, 1944, Serial No. 517,302

9 Claims. (Cl. 73—212)

My invention relates to devices for indicating the speed of a craft with reference to the medium through which it moves and more particularly to Pitot tubes.

My invention has particular utility for indicating the air speed of an aircraft by means of the measurement of the dynamic air pressure, and also the measurement of the relative dynamic and static pressures. My invention is, however, not limited to this particular application but is applicable to any application of Pitot tubes.

As is well known, Pitot tubes are mounted on the outer portion of an aircraft wing, outboard strut or other location of an aircraft where the tube opening will be exposed to undisturbed air flow. By means of suitable pipes the tube opening is connected to an instrument on the instrument panel. The dynamic pressure is usually communicated to the interior of a hermetically sealed chamber having a movable diaphragm in one wall thereof for operating an indicator, and the static pressure is communicated to the outside of the chamber to exert a pressure on the diaphragm in opposition to the dynamic pressure effect. The differential pressure effect is thus indicated by the instrument thus indicating, or recording, as may be desired, the speed of the fluid relative to the Pitot tube. With other instruments the two pressures are communicated to two Bourdon tubes coupled mechanically at their movable ends in opposition or communicated to two Sylphon bellows constructed like the Sylphon bellows of aneroid barometers, which Sylphon bellows are also mechanically coupled in opposition at their movable portions to thus produce indicator measurements proportional to the pressure differences in the two pressure responsive members. To make the instrument particularly useful to the pilot, the calibration is usually in miles per hour.

Since the Pitot tube must necessarily be located in the undisturbed region of the air, it is exposed to all climatic conditions and thus is particularly subject to the temperature of the surrounding air and the moisture content thereof. The introduction of moisture into the Pitot tube at the low temperatures usually encountered by aircraft at high altitudes causes the moisture to freeze in the tube and thus impair and more often completely prevent the operation of the air-speed indicating instrument.

One object of my invention is the prevention of the forming of any obstructing moisture whether in the form of ice or in the form of liquid in a Pitot tube.

Another object of my invention is the provision of means for heating a Pitot tube by means that may be readily manufactured and readily assembled and by means of which the heat is properly distributed so that moisture that may collect in the tube is maintained in a fluid state and is thus readily and continuously discharged from the tube.

Another object is the provision of a single efficient heating unit for a Pitot tube that is mounted in fixed relation to the tube.

A still further object of my invention is the provision of an improved tube construction for air-speed indicators.

An important object of my invention is to simplify the construction and assembly and reduce the cost of the heater unit for electrically heated air-speed tubes.

Another important object of my invention is the provision of a single generally cylindrical electrical heating unit disposed between two interfitting tubes comprising a Pitot tube.

It is also a broad object of my invention to provide an electrically heated Pitot tube of simple structure and having elements that may be easily and cheaply assembled and that may have improved operating characteristics.

Other objects and advantages will become more apparent from a study of the following specification and the accompanying drawing, in which:

Figure 1 is a longitudinal sectional view of the housing portion of a Pitot tube with certain parts broken away on section line I—I of Fig. 5 to illustrate some details;

Fig. 2 is an enlarged transverse sectional view on section line II—II of Fig. 1;

Figs. 3, 4 and 5 are transverse sectional views on section lines III, IV, and V, respectively, of Fig. 1;

Fig. 6 shows a modified construction of my Pitot tube showing the parts in longitudinal sectional view; and Fig. 7 is an enlarged transverse sectional view on section line VII—VII of Fig. 6.

So far as the outer contour of my improved Pitot tube is concerned, it is, in a general sense, conventional in shape, that is, it has an outer cylindrical tube or casing 1 provided with a tapered forward end 2. The casing is preferably made of sheet or extruded brass, copper, or some other metal or alloy having good heat conducting properties and being resistant to corrosion. Since this sheet material is easily formed, the tapered end 2 may be formed by spinning.

At the right-hand end, or rear end, the tube 1 fits into a machined portion of a brass or copper casting 3 and is secured to this casting by soldering or brazing or in some other suitable manner. The casting has a supporting portion 4. This portion provides a rigid interconnection between the casting 3 and suitable brackets, not shown, which are rigidly mounted on some suitable portion of the aircraft. The point of connection of the Pitot tube is so selected that it is rigidly supported to point in the direction the aircraft is pointing and at a region of air flow undisturbed by the craft itself.

The casting, or end member 3, has an end wall 7 having apertures 8, 8' and 9, as shown in Fig. 1. Apertures 8 and 8' receive the conductors 10 and 11 leading to the heater unit 12 and aperture 9 receives the tube 19 all described more in detail hereinafter.

The conductors 10 and 11 are suitably connected to the connector studs 13 within insulating ferrules F shown, and the parts are held in firm relation to the wall 7 by means described more in detail hereinafter.

The wall 7, provided with the third aperture 9, receives through a seal 23 in this aperture the outlet tube 19 for the dynamic pressure transmitting communication. This tube 19, when in position in casting 3, is connected by means of pipe connection 21 to another tube leading to the air-speed indicating instrument (not shown).

At the nose or left-hand end of casing 1, I provide the opening 5 for receiving the dynamic air pressure and for communicating that pressure to the region within the tube.

Wind tunnel tests have shown that Pitot tubes having a comparatively long tapered nose or portion 2 give a more accurate air speed indication under varying angles of air flow with reference to the longitudinal axis of the tube than do those tubes having a blunt or stub nose. The aircraft industry has, however, been forced to accept the blunt-nose type of Pitot tube in place of the long-tapered type nose because not enough heat could be transmitted to the tip of the tube to prevent icing.

Since the overall diameter of the tube also affects the accuracy of the air speed measurement, the accuracy being increased with tubes of small diameter, the requirements of the aircraft industry are that the outside diameter of the tube do not exceed nine-sixteenths of an inch.

Such requirements present a real manufacturing problem. The tubes have to be heated electrically, and it is thus extremely difficult to get a cartridge type heater into such a tube and still get enough heating and also be able to get the pressure transmitting tubes or conduits into the tube casing. This task becomes increasingly greater as the taper of the nose is increased, since it is at the nose, or tapered region, where proper heating is most essential.

With my invention all the difficulties of the prior art have been eliminated. With the construction I have devised, heat is forced directly to the long tapered nose.

With my construction, I utilize a sandwich or very flat type mica insulated heating element. This flat heating element 12 I curve into a generally cylindrical shape and insert it into the outer casing from the rear end of the casing. When in position, it contacts the inner surface of the casing over about 250°. The heating element 12 can thus be brought right up against and, if desired, somewhat into the long-tapered portion 2. I so position the heating element that it is disposed symmetrically with reference to a vertical plane through the longitudinal axis of the tube. The showings in Figs. 2 and 7 best illustrate the disposition of the heating element 12 with reference to the casing 1.

I then position a second tube 14, having an outer tapered portion 6 substantially matching the inner taper of casing 1, within the curvature of the heating element, into the casing 1. Then by means of a rubber punch, or by means of hydraulic pressure, I expand the inner tube 14 so that it firmly positions the heating element against the casing 1.

Since the inner tube 14 will fit snugly against the inner bottom of the tube or casing 1, the tube 14 may be brazed to the outer casing at the bottom. To effect this excellent heat conducting connection, I provide the outer casing with the openings 16 and 17. Through these openings and at the nose of the tubes 2 and 14 the tubes are then brazed to each other forming a rigid construction.

Since the Pitot tube has to have moisture draining holes, I drill small drain holes 26 and 27 through both the solidified brazing material in the openings 16 and 17 and the tube 14.

A still more effective moisture draining structure may be obtained by providing the outer casing 1 with a narrow slot at the bottom for the distance between the final drain holes. This slot 28 is shown in Figs. 6 and 7. When the inner tube 14 is subjected to the expanding pressure, the inner tube 14 will form a trough for the entire length of the slot thus improving the moisture collection in the tube 14.

The brazing operation may then be effected through the slot. The brazing material will thus fill the slot. The drain holes 26' and 27' are then made at or near the ends of the trough. The brazing in the slot is, of course, smoothed off so that the entire tube has a smooth outer contour.

The tube 14 is then shaped at the rear and, at region 18, where tube 19 is provided with a snugly fitting metallic washer, the tube 14 and the washer are brazed to the tube 19, to form a hermetic connection between tubes 14 and 19. Once the tube 19 is brazed into position at region 18, the leads 15 are soldered to the terminals of the heating unit 12 at region 20 and at their other ends are soldered to the conductors 10 and 11 at region 22. The tube 19 and conductors 10 and 11, with a portion of the ferrule F for these conductors, are then slipped through the apertures in the casting 3. The studs 13 are then screwed down against washers 24 of insulating material. The assembly is then placed in a brazing furnace and the tube 19 is brazed to the casting at region 23 and the casting 3 and casing 1 are brazed to each other at region 25.

It will be noted that the heating unit is by my construction positioned right up against the tapered nose and that the heat from the heating unit is transmitted to the region of the drain holes by two heat conducting paths. With my construction the more accurate long-tapered nose and the tube with the smaller over all diameter can be used.

While I have disclosed but one embodiment coupled with a variant as to some details, I do not wish to be limited to the particular showing made nor the methods of assembly described but wish to be limited only by the scope of the claims thereto appended.

I claim as my invention:

1. An electrically heated Pitot tube comprising an outer casing of heat conducting metal; an inner sleeve, having one relatively broad longitudinal slit, of dielectric material disposed within the casing; an electric heating conductor, provided with suitable terminals for connection to a source of electrical energy, imbedded in the dielectric material; an inner tube of heat conducting material firmly positioned against the inner surface of the sleeve and part of the inner surface of the casing not covered by the sleeve, and securing means for firmly holding the casing and inner tube in fixed relation.

2. An electrically heated Pitot tube comprising an outer casing of heat conducting metal; an inner sleeve, having one relatively broad longitudinal slit, of dielectric material disposed within the casing; an electric heating conductor, provided with suitable terminals for connection to a source of electrical energy, imbedded in the dielectric material; an inner tube of heat conducting material firmly positioned against the inner surface of the sleeve and part of the inner surface of the casing not covered by the sleeve, and securing means for firmly holding the casing and inner tube in fixed relation, said casing and inner tube being provided with a relatively small moisture drain hole at the region where the casing and tube are in contact.

3. An electrically heated tube comprising an outer relatively long cylindrical casing having a relatively small diameter and formed of good heat conducting metal, said casing having a narrow longitudinally disposed slot at the bottom of the casing; a sleeve of insulating material, and having a relatively broad slit for its entire length, disposed within the casing so that the slit is adjacent to and symmetrically aligned with reference to the slot in the casing; an electric heater, provided with suitable terminals for connection to a source of electrical energy, imbedded in the insulating material; an inner tube of ductile and good heat conducting metal disposed within the sleeve and expanded against the sleeve and the casing, where not covered by the sleeve, to firmly position the sleeve in the casing and to form a trough in the inner tube at the slot in the casing, and a small drain hole at the bottom of the trough formed in the inner tube.

4. An electrically heated tube comprising an outer relatively long cylindrical casing having a relatively small diameter and formed of good heat conducting metal, said casing having a narrow longitudinally disposed slot at the bottom of the casing; a sleeve of insulating material, of relatively good heat conducting properties, and having a relatively broad slit for its entire length, disposed within the casing so that the slit is adjacent to and symmetrically aligned with reference to the slot in the casing; an electric heater, provided with suitable terminals for connection to a source of electrical energy, imbedded in the insulating material; an inner tube of ductile and good heat conducting metal disposed within the sleeve and expanded outwardly against the sleeve and the casing, where not covered by the sleeve, to firmly position the sleeve in the casing and to form a trough in the inner tube at the slot in the casing, and a small drain hole at each end and at the bottom of the trough formed in the inner tube.

5. An electrically heated tube comprising an outer casing of good heat conducting metal, a thin electrically insulated heating unit lining the casing for a given length except at one longitudinal region, an inner tube of good heat conducting metal expanded outwardly against the heating unit and the casing, said inner tube being rigidly secured to the casing at the longitudinal region of the casing not lined by the heating unit to form a unitary Pitot tube.

6. In a Pitot tube for measuring the dynamic pressure of relatively cold moisture laden air in combination, an outer cylindrical casing that is small in diameter relative to its length formed with a long tapered nose, a flat electrical heating element, that is rather narrow and long and, before being formed into shape, is substantially rectangular in shape, formed into a shape having a C-shaped appearance on its transverse section disposed within the outer casing so that its end fits against the inner surface of the long tapered nose of the casing, a tube of pliable metal having good heat conducting properties disposed inside the heating element and expanded outwardly agianst the heating element so that the heating element is firmly disposed between the outer casing and the inner tube.

7. In a Pitot tube for measuring the dynamic pressure of relatively cold moisture laden air flowing from the front toward the rear of the tube, in combination, an outer cylindrical casing, that is rather small in diameter relative to its length, formed with a relatively long tapered nose, a relatively flat thin elongated electrical heating element bent in a shape to have a C-shaped transverse section inserted into the casing so that the front end of the element is brought in proximity to the inner rear portion of the nose of the casing, an inner tube disposed within the heating element and expanded outwardly so that the inner tube fits against the inner surface of the nose and firmly positions the heating element between the inner tube and the casing, a pressure collecting conduit extending into the rear end of the inner tube and having a hermetic connection at its outer periphery with the rear end of the inner tube, and moisture draining means at the bottom of the casing and inner tube.

8. The method of forming an electrically heated Pitot tube having a relatively small diameter and a length considerably greater than its diameter, including, shaping the front of a tube to have a relatively long tapered nose, cutting a relatively narrow slot of a given length longitudinally of the bottom of the tube, forming a relatively thin long and narrow electrical heating unit into an envelope so as to have a C-shaped transverse section and inserting this envelope into the tube so that the front end is brought in proximity to the rear inner surface of the nose, inserting a deformable metal inner tube into the envelope and outer tube, subjecting the inner tube to internal pressure to expand it against the inner surface of the nose, the heating unit, and the outer tube where the heating unit does not line the outer tube, whereby the heating unit is firmly positioned in the outer tube and the inner tube is formed into a trough at the region of the slot in the outer tube, soldering the inner tube to the outer tube at the slot in the outer tube, and providing the trough with a drain hole.

9. The method of forming an electrically heated Pitot tube having a relatively small diameter and a length considerably greater than its diameter, including, shaping the front end of a tube into a tapered nose so as to have a relatively small opening at the nose, forming an electric heating unit into the shape of a longitudinally slitted sleeve and inserting this unit into the tube so that one end fits into the rear end of the tapered nose, the dimensions of the sleeve being such that a portion of the tube longitudinally of the inner surface thereof is not covered by the heating unit, inserting a deformable metal tube of good heat conducting properties into the heating unit, subjecting the inner tube to internal pressure to expand the inner tube against the heating unit and the outer tube where not covered by the heating unit, whereby the heating unit is firmly sandwiched between the outer tube and the inner tube, and brazing the inner tube and outer tube.

KENNETH L. WOODMAN.